US012603363B2

(12) United States Patent
Kim et al.

(10) Patent No.: US 12,603,363 B2
(45) Date of Patent: Apr. 14, 2026

(54) EXTERIOR MATERIAL, METHOD OF FORMING PATTERN ON EXTERIOR MATERIAL, AND METHOD OF MANUFACTURING BATTERY INCLUDING EXTERIOR MATERIAL

(71) Applicant: LiBEST INC., Daejeon (KR)

(72) Inventors: Joo Seong Kim, Sejong-si (KR); Seung Gyu Lim, Daejeon (KR); Gil Ju Lee, Daejeon (KR)

(73) Assignee: LiBEST INC., Yuseong-Gu (KR)

( * ) Notice: Subject to any disclaimer, the term of this patent is extended or adjusted under 35 U.S.C. 154(b) by 652 days.

(21) Appl. No.: 17/999,160

(22) PCT Filed: Dec. 14, 2021

(86) PCT No.: PCT/KR2021/018926
§ 371 (c)(1),
(2) Date: Nov. 17, 2022

(87) PCT Pub. No.: WO2022/145810
PCT Pub. Date: Jul. 7, 2022

(65) Prior Publication Data
US 2023/0198061 A1　Jun. 22, 2023

(30) Foreign Application Priority Data
Dec. 28, 2020　(KR) ........................ 10-2020-0184913

(51) Int. Cl.
*H01M 10/04*　(2006.01)
*H01M 50/124*　(2021.01)
(Continued)

(52) U.S. Cl.
CPC ....... *H01M 50/124* (2021.01); *H01M 10/049* (2013.01); *H01M 50/136* (2021.01); *H01M 50/186* (2021.01)

(58) Field of Classification Search
CPC ............... H01M 10/04; H01M 10/049; H01M 50/10–102; H01M 50/105;
(Continued)

(56) References Cited

U.S. PATENT DOCUMENTS

| | | | |
|---|---|---|---|
| 2016/0093839 A1* | 3/2016 | Iseri | ................... H01M 50/136 429/127 |
| 2017/0117511 A1* | 4/2017 | Takahashi | .......... H01M 50/141 |

(Continued)

FOREIGN PATENT DOCUMENTS

| | | |
|---|---|---|
| JP | 2009087750 A | 4/2009 |
| JP | 2013218991 | 10/2013 |

(Continued)

OTHER PUBLICATIONS

International Search Report (with English translation) issued in PCT/KR2021/018926, dated Mar. 11, 2022, 5 pages provided.
(Continued)

*Primary Examiner* — Nicole M. Buie-Hatcher
*Assistant Examiner* — Jacob Buchanan
(74) *Attorney, Agent, or Firm* — HSML P.C.

(57) ABSTRACT

An exterior material to be used for a battery comprises at least one pattern part formed in a machine direction (MD) of the exterior material, wherein the MD of the exterior material is a width direction of a battery including the exterior material, and a transverse direction (TD) of the exterior material is a longitudinal direction of the battery including the exterior material.

9 Claims, 8 Drawing Sheets

10

(51) Int. Cl.
 H01M 50/136 (2021.01)
 H01M 50/186 (2021.01)
(58) Field of Classification Search
 CPC ............. H01M 50/124; H01M 50/131; H01M
 50/136; H01M 50/183–186
 See application file for complete search history.

(56) References Cited

U.S. PATENT DOCUMENTS

| | | | | |
|---|---|---|---|---|
| 2020/0358043 | A1* | 11/2020 | Kim | .................... H01M 50/121 |
| 2023/0187742 | A1* | 6/2023 | Kim | ........................ B32B 27/32 |
| | | | | 429/163 |

FOREIGN PATENT DOCUMENTS

| | | | |
|---|---|---|---|
| JP | 2017033931 | A | 2/2017 |
| JP | 2017117776 | A | 6/2017 |
| JP | 2017532728 | A | 11/2017 |
| KR | 1020050052069 | | 6/2005 |
| KR | 10-1294259 | B1 | 8/2013 |
| KR | 10-2016-0031441 | A | 3/2016 |
| KR | 10-2017-0019970 | A | 2/2017 |
| KR | 10-2017-0028675 | A | 3/2017 |
| KR | 10-2017-0101120 | A | 9/2017 |
| KR | 10-2019-0024451 | A | 3/2019 |
| WO | WO-2019103447 | A1 * | 5/2019 ........ H01M 10/0525 |
| WO | 2020256412 | A1 | 12/2020 |

OTHER PUBLICATIONS

Notice of Reasons for Refusal dated Jan. 9, 2024 for JP application No. 2022 570677 with machine translation.

The extended European Search Report issued in a counterpart European Application No. 21915608.0, mailing date is Jun. 25, 2024.

Office Action issued in a counterpart Japanese Application No. 2022-570677, mailing date is Aug. 6, 2024, with machine translation.

\* cited by examiner

Figure 8:
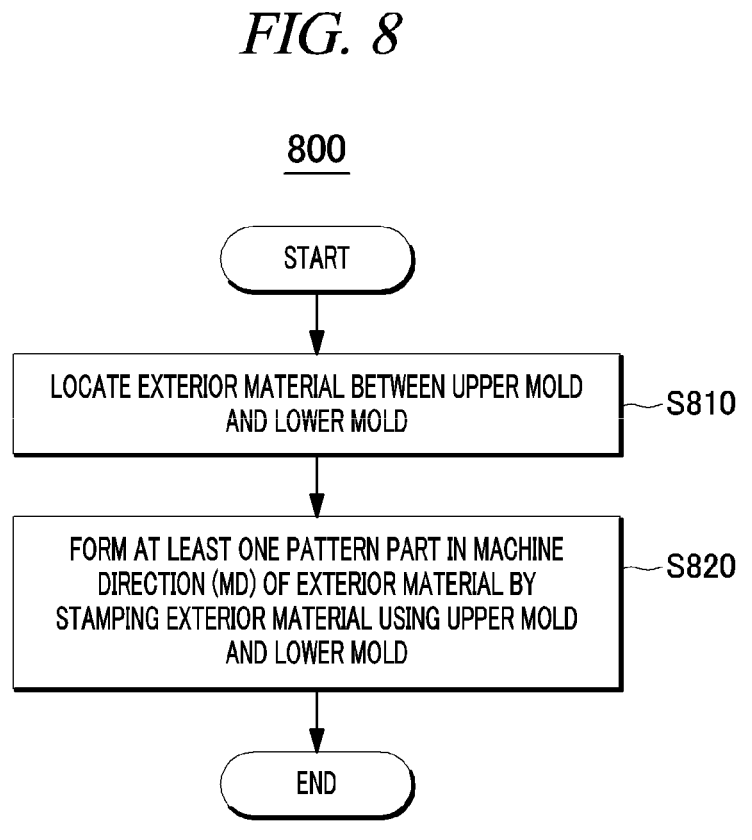

START

LOCATE EXTERIOR MATERIAL BETWEEN UPPER MOLD
AND LOWER MOLD ——— S810

FORM AT LEAST ONE PATTERN PART IN MACHINE
DIRECTION (MD) OF EXTERIOR MATERIAL BY
STAMPING EXTERIOR MATERIAL USING UPPER MOLD
AND LOWER MOLD ——— S820

END

Figure 9:
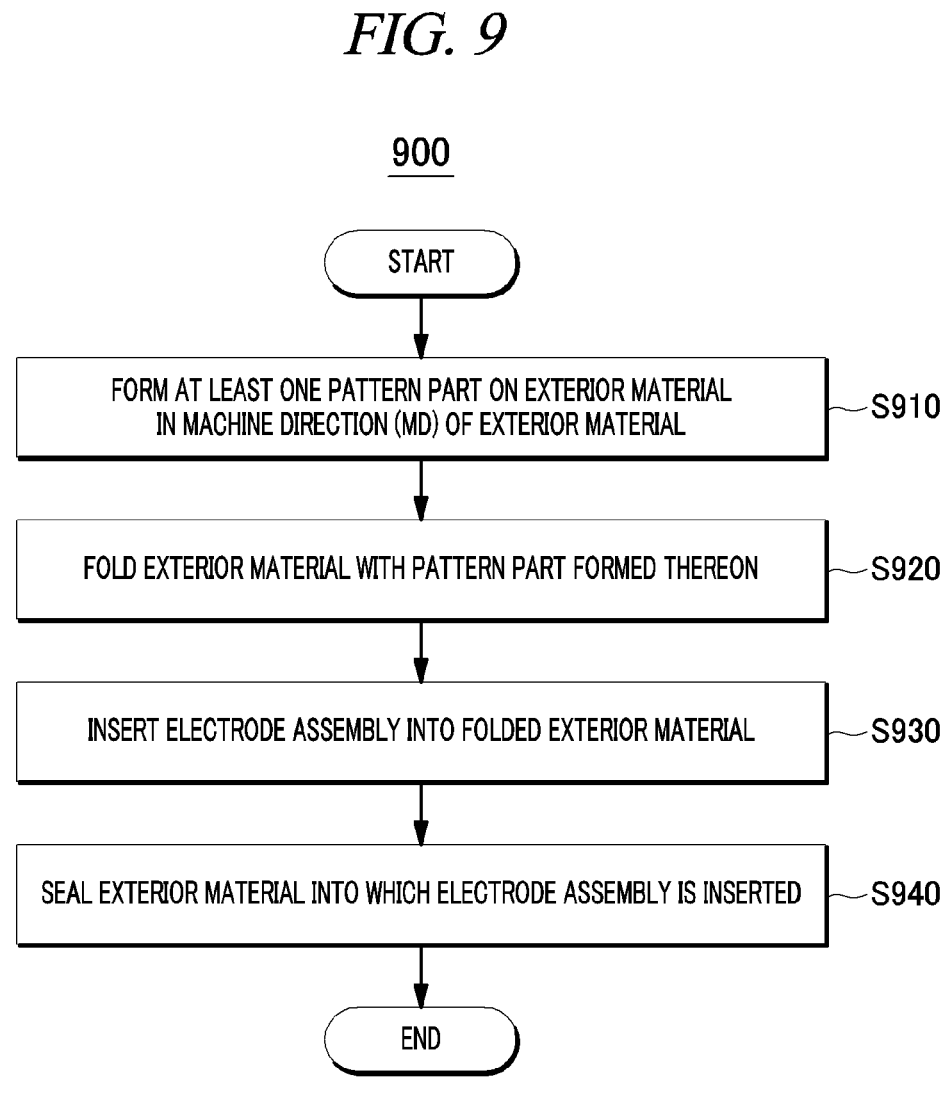

START

FORM AT LEAST ONE PATTERN PART ON EXTERIOR MATERIAL IN MACHINE DIRECTION (MD) OF EXTERIOR MATERIAL — S910

FOLD EXTERIOR MATERIAL WITH PATTERN PART FORMED THEREON — S920

INSERT ELECTRODE ASSEMBLY INTO FOLDED EXTERIOR MATERIAL — S930

SEAL EXTERIOR MATERIAL INTO WHICH ELECTRODE ASSEMBLY IS INSERTED — S940

END

EXTERIOR MATERIAL, METHOD OF FORMING PATTERN ON EXTERIOR MATERIAL, AND METHOD OF MANUFACTURING BATTERY INCLUDING EXTERIOR MATERIAL

TECHNICAL FIELD

The present disclosure relates to an exterior material, method of forming pattern on exterior material, and method of manufacturing battery including exterior material.

BACKGROUND

An electrochemical cell refers to an assembly that is composed of at least two electrodes and an electrolyte to provide electrical energy, and in particular, lithium-ion batteries configured as chargeable and dischargeable secondary cells are being widely used for various advanced electronic devices including smart phones.

Recently, various attempts have been made to deviate from conventional shapes in the design of mobile devices, including smartphones, and various wearable devices. Also, attention is increasing on flexible devices which can be bent while maintaining their functions. Accordingly, it is important to secure the function and safety of a flexible electrochemical cell which can be built in such a flexible device and can be used as a power source.

If a flexible battery is repeatedly bent and straightened, an exterior material may be damaged. If the exterior material is severely damaged, the internal electrolyte may leak. Also, even if the exterior material is slightly damaged, moisture in the air may permeate into the battery, which may cause swelling of the battery and damage to the electrode and thus may result in a decrease in capacity and output of the battery.

Therefore, in order to suppress damage to the exterior material of the flexible battery by absorbing the compressive stress and tensile stress generated in a portion where the battery is bent, pattern processing is performed by pressing upper and lower molds on the exterior material. Since the pattern-processed exterior material has a high initial modulus of elasticity (initial elastic modulus), the force acting on the exterior material when the battery is bent is dispersed rather than concentrated on one side. Accordingly, the exterior material and an electrode assembly accommodated therein are not severely bent at any one part.

The pattern of the exterior material does not need to be formed deeply, but needs to minimize damage to the exterior material caused by repetitive bending, flexure, folding, twist, etc. of the battery and improve the durability of the battery.

When an external force is applied to the battery, for example, when bending, folding, or twist of the battery occurs, the compressive force applied in a thickness direction rather than the tensile force applied in a longitudinal direction of the exterior material has a greater effect on the durability of the battery.

Also, as the electrode assembly accommodated within the exterior material is deformed, the force pushing the exterior material outwards is applied. If the exterior material does not withstand the force acting from the inner electrode assembly, the inner electrode assembly is easily bent around a weak part of the exterior material and the weak part of the exterior material is damaged, which results in formation of pinholes, cracks or the like.

In order to further improve the durability of the flexible battery, a pattern processing method capable of increasing the bending moment in a portion where the battery is bent needs to be adopted. Specifically, in order to increase the bending durability of the flexible battery, there is a need for a method of forming a pattern to increase the fatigue life of the exterior material.

(Patent Document 1) Korean Patent Laid-open Publication No. 2005-0052069 (published on Jun. 2, 2005)
(Patent Document 2) Japanese Patent Laid-open Publication No. 2013-218991 (published on Oct. 24, 2013)

DISCLOSURE OF THE INVENTION

Problems to Be Solved By the Invention

The present disclosure is to solve the problems of the prior art described above, and provides an exterior material to be used for a battery. The exterior material includes at least one pattern part formed in a machine direction (MD) of the exterior material, the MD of the exterior material refers to a width direction of a battery including the exterior material, and a transverse direction (TD) of the exterior material refers to a longitudinal direction of the battery including the exterior material.

An object of the present disclosure is to provide a method of forming a pattern on an exterior material in a direction in which the fatigue life of the exterior material is long to suppress damage to the exterior material and improve the durability of a battery, and a method of manufacturing a battery including the exterior material.

However, the problems to be solved by the present disclosure are not limited to the above-described problems. There may be other problems to be solved by the present disclosure.

Means for Solving the Problems

As a means for solving the problems, according to an aspect of the present disclosure, an exterior material to be used for a battery, comprises at least one pattern part formed in a machine direction (MD) of the exterior material, wherein the MD of the exterior material is a width direction of a battery including the exterior material, and a transverse direction (TD) of the exterior material is a longitudinal direction of the battery including the exterior material.

In one embodiment, the exterior material is folded in the TD of the exterior material and used in manufacturing the battery, and the exterior material used in manufacturing the battery is bent in the TD of the exterior material, which enables the battery to be bent in the TD of the exterior material.

In one embodiment, the exterior material is folded in the MD of the exterior material and used in manufacturing the battery, and the exterior material used in manufacturing the battery is bent in the TD of the exterior material, which enables the battery to be bent in the TD of the exterior material.

In one embodiment, the exterior material further comprises a sealing part enclosing the pattern part and formed by bonding parts of two surfaces of the exterior material to form a sealed space between the two surfaces, wherein an edge portion of the pattern part is adjacent to the sealing part.

In one embodiment, a radius of curvature of the edge portion of the pattern part is smaller than a radius of curvature of a central portion of the pattern part.

In one embodiment, a radius of curvature of the pattern part decreases from a central portion toward the edge portion of the pattern part.

In one embodiment, the pattern part is formed in the MD of the exterior material in consideration of probability of damage to the edge portion of the pattern part.

In one embodiment, a fatigue life against deformation of the edge portion of the pattern part is set based on the pattern part formed in the MD of the exterior material.

In one embodiment, the fatigue life against deformation of the edge portion of the pattern part is longer than a fatigue life against deformation of an edge portion of a pattern part of another exterior material including at least one pattern part formed in the TD of the exterior material.

In one embodiment, the exterior material is formed into a multilayer structure in which at least one material is laminated.

According to another aspect of the present disclosure, a method of forming a pattern on an exterior material comprises locating the exterior material between an upper mold and a lower mold, and forming at least one pattern part in a machine direction (MD) of the exterior material by stamping the exterior material using the upper mold and the lower mold, wherein the MD of the exterior material is a width direction of a battery including the exterior material, and a transverse direction (TD) of the exterior material is a longitudinal direction of the battery including the exterior material.

According to yet another aspect of the present disclosure, a method of manufacturing a battery including an exterior material comprises forming at least one pattern part on an exterior material in a machine direction (MD) of the exterior material, folding the exterior material, inserting an electrode assembly into the folded exterior material and sealing the exterior material into which the electrode assembly is inserted, wherein the MD of the exterior material is a width direction of the battery including the exterior material, and a transverse direction (TD) of the exterior material is a longitudinal direction of the battery including the exterior material.

Effects of the Invention

According to any one of the means for solving the problems of the present disclosure described above, the present disclosure provides an exterior material to be used for a battery. The exterior material includes at least one pattern part formed in a machine direction (MD) of the exterior material, the MD of the exterior material refers to a width direction of a battery including the exterior material, and a transverse direction (TD) of the exterior material refers to a longitudinal direction of the battery including the exterior material.

Also, the present disclosure provides a method of forming a pattern on an exterior material in a direction in which the fatigue life of the exterior material is long, and a method of manufacturing a battery including the exterior material. Accordingly, damage to a pattern edge portion having a small radius of curvature can be suppressed. Thus, it is possible to improve the bending durability of the battery.

Further, it is possible to improve the safety in use of the battery by suppressing damage to the pattern edge portion of the exterior material and leakage of an electrolyte.

BRIEF DESCRIPTION OF THE DRAWINGS

FIG. 8 is a flowchart showing a method of forming a pattern on an exterior material according to an embodiment of the present disclosure.

FIG. 9 is a flowchart showing a method of manufacturing a battery including an exterior material according to an embodiment of the present disclosure.

BEST MODE FOR CARRYING OUT THE INVENTION

Figure 1:
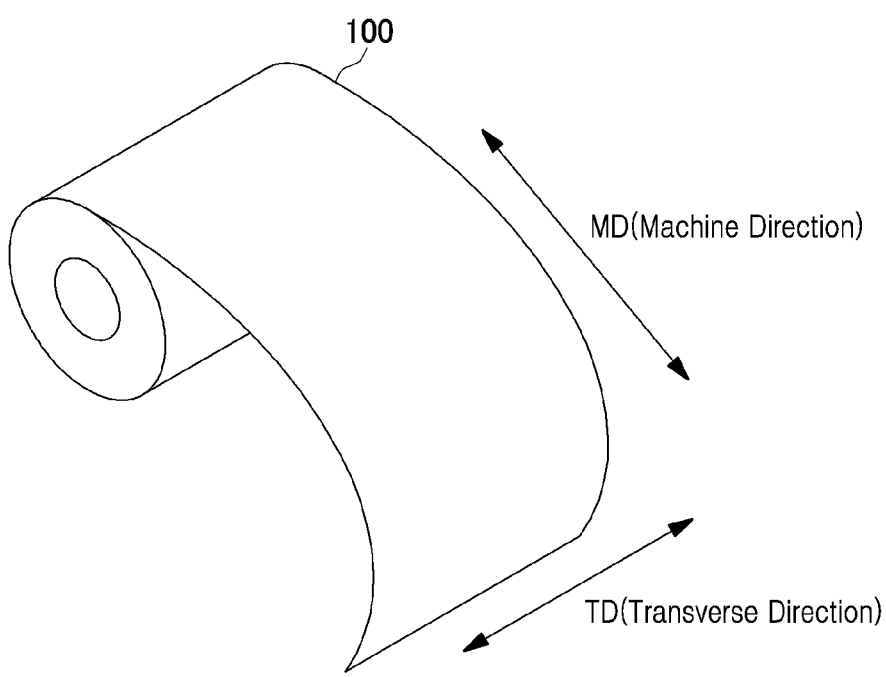
FIG. 1 illustrates an exterior material.

Hereafter, embodiments of the present disclosure will be described in detail with reference to the accompanying drawings so that the present disclosure may be readily implemented by a person with ordinary skill in the art. However, it is to be noted that the present disclosure is not limited to the embodiments but may be embodied in various other ways. In drawings, parts irrelevant to the description are omitted for the simplicity of explanation, and like reference numerals denote like parts through the whole document.

Throughout this document, the terms "comprises," "includes," "comprising," and/or "including" means that one or more other components, steps, operations, and/or elements are not excluded from the described and recited systems, devices, apparatuses, and methods unless context dictates otherwise; and is not intended to preclude the possibility that one or more other components, steps, operations, parts, or combinations thereof may exist or may be added. Further, throughout this document, the term "connected to" may be used to designate a connection or coupling of one element to another element and includes both an element being "directly connected" another element and an element being "electronically connected" to another element via another element. Furthermore, throughout this document, when a member is said to be located "on" another member, this includes not only when the member is in contact with another member, but also when other member is present between the two members.

A battery including an exterior material according to the present disclosure may be, for example, an electrochemical cell such as a lithium-ion battery. Specifically, the battery including an exterior material according to the present disclosure may be configured such that an electrode assembly is accommodated and sealed with an electrolyte within the exterior material, and charged and discharged by movement of lithium ions. The battery including an exterior material according to the present disclosure may be a flexible battery configured to be bent with flexibility while maintaining its function. Hereinafter, embodiments of the present disclosure will be described in detail with reference to the accompanying drawings.

FIG. 1 illustrates an exterior material. The exterior material 100 may be formed into, for example, a multilayer structure in which at least one material is laminated. At least one material may have ductility.

For example, the multilayer structure of the exterior material 100 may include a sealing layer, a material barrier layer and a protection layer, which are classified depending on the function of each layer. The sealing layer may be formed of a polypropylene (PP) film. The material barrier layer may be formed of aluminum foil. The protection layer may be formed of a nylon film or a nylon and polyethylene terephthalate (PET) composite layer.

The exterior material 100 is manufactured by a roll-to-roll process, and mechanical properties of the exterior material 100 may be different between an axial direction and a longitudinal direction of the roll. Herein, a machine direction (MD) may refer to the longitudinal direction of the roll, and a transverse direction (TD) may refer to the axial direction of the roll.

Due to an exterior material used for a flexible battery, mechanical properties of the battery may vary depending on a direction in which a pattern is formed. That is, a battery including an exterior material with a pattern formed in the MD of the exterior material may be different in mechanical properties from a battery including an exterior material with a pattern formed in the TD of the exterior material. Accordingly, the direction in which the pattern is formed may affect the durability of a pattern edge portion of the flexible battery.

Figure 2:
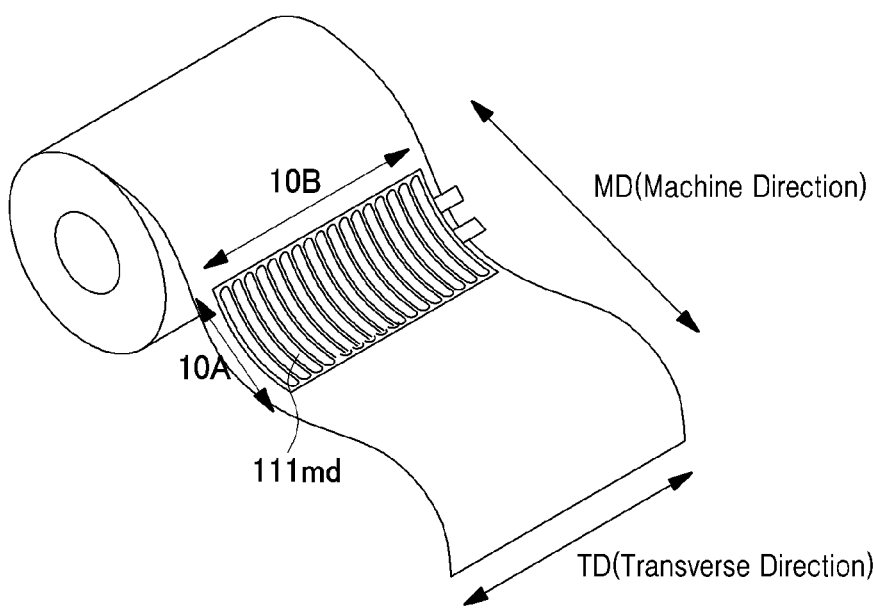
FIG. 2 illustrates an exterior material and a pattern part according to an embodiment of the present disclosure.

FIG. 2 illustrates an exterior material and a pattern part according to an embodiment of the present disclosure. Referring to FIG. 2, the exterior material 100 may include at least one pattern part 111*md* formed in the MD of the exterior material 100.

When a battery is manufactured including the exterior material 100 on which the pattern part 111*md* shown in FIG. 2 is formed, the MD of the exterior material may be a width direction 10A of the battery and the TD of the exterior material may be a longitudinal direction 10B of the battery.

Figure 3:
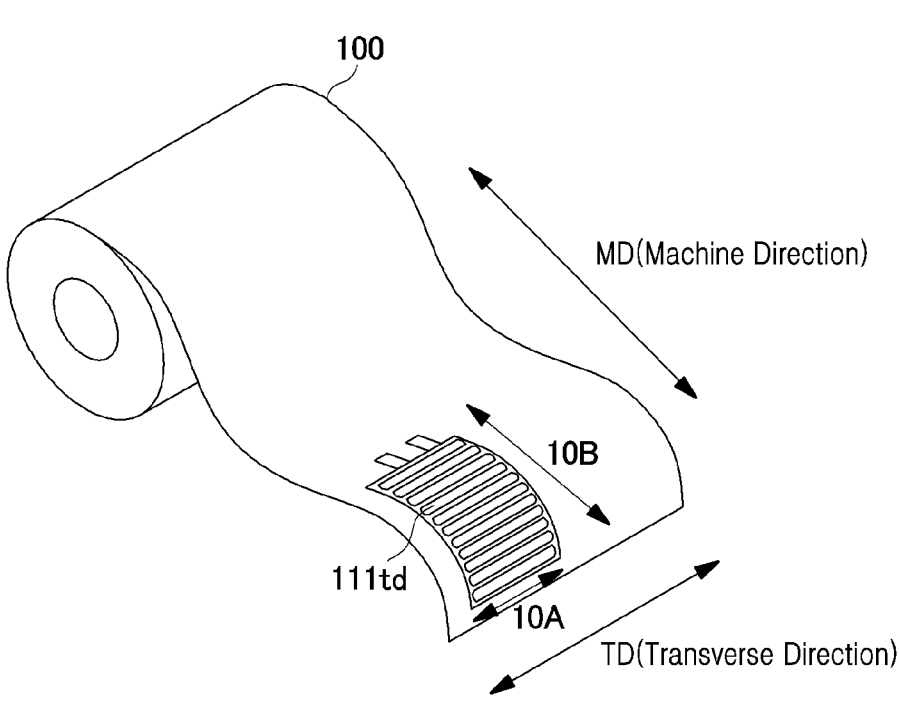
FIG. 3 illustrates an exterior material with a pattern part formed in a different direction from the pattern part shown in FIG. 2.

FIG. 3 illustrates an exterior material with a pattern part 111*td* formed in a different direction from the pattern part 111*md* shown in FIG. 2. On the exterior material shown in FIG. 3, the pattern part 111*td* is formed in the TD of the exterior material.

When the battery is manufactured including the exterior material 100 on which the pattern part 111*td* shown in FIG. 3 is formed, the TD of the exterior material may be the width direction 10A of the battery and the MD of the exterior material may be the longitudinal direction 10B of the battery.

Figure 4A:
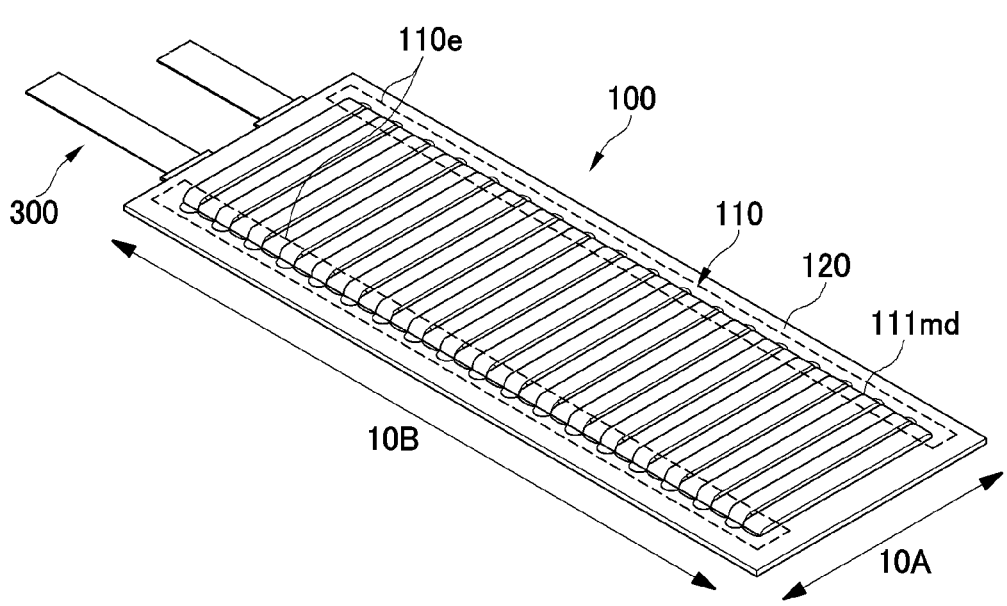
FIG. 4A is a perspective view illustrating a battery including the exterior material according to an embodiment of the present disclosure.
Figure 4B:
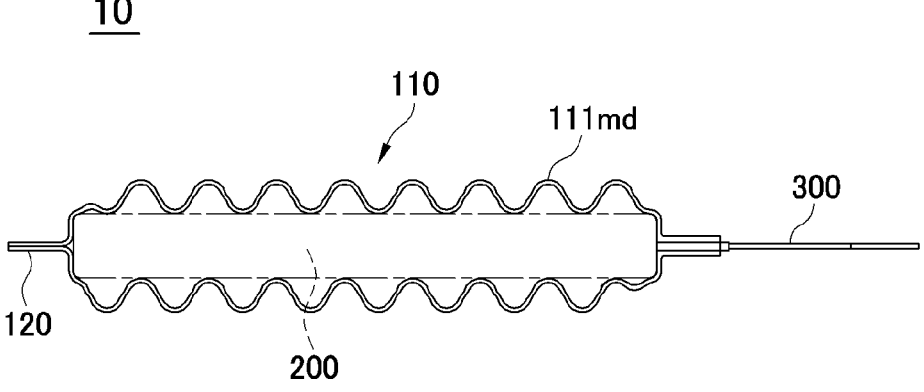
FIG. 4B is a cross-sectional view of the battery shown in FIG. 4A.

FIG. 4A is a perspective view illustrating a battery including the exterior material 100 according to an embodiment of the present disclosure, and FIG. 4B is a cross-sectional view of the battery shown in FIG. 4A.

Referring to FIG. 4A and FIG. 4B, a battery 10 includes the exterior material 100, an electrode assembly 200 accommodated within the exterior material 100 and an electrode lead 300 connected to the electrode assembly 200.

The electrode assembly 200 includes a plurality of electrodes and may further include a separator, and may have a structure in which they are laminated in a thickness direction.

The electrode assembly 200 may include first and second electrodes having different polarities, and a mixture including an active material may be coated on both surfaces or one surface of each of the first and second electrodes. A separator may be interposed between the first electrode and the second electrode. For example, in the first electrode used as a negative electrode, a current collector is made of copper, aluminum, etc., and an anode material which is one or a combination of graphite, carbon, lithium, silicon, silicon derivatives, such as $SiO_x$, silicon-graphite composite, tin and silicon-tin composite. Also, in the second electrode used as a positive electrode, a current collector is made of aluminum, stainless steel, etc., and a cathode material which is one or a combination of lithium cobalt oxide, lithium nickel oxide, lithium manganese oxide, lithium cobalt-manganese oxide, lithium cobalt-nickel oxide, lithium manganese-nickel oxide, lithium cobalt-nickel-manganese oxide, lithium cobalt-nickel-aluminum oxide and lithium iron phosphate.

The electrode assembly 200 has a shape having a small thickness in the thickness direction in which the active materials and the separator are laminated, and the active materials extend longer in a longitudinal direction than in a width direction among two directions in which the first and second electrodes extend to form a surface, and intersect with (for example, orthogonal to) the directions in which the surface is formed.

Further, the electrode assembly 200 may include electrode connection tabs and lead connection tabs. The electrode connection tabs may be formed to protrude from one ends of the first and second electrodes in the longitudinal direction, and electrode connection tabs protruding from electrodes having the same polarity may be coupled to each other. The electrodes may be electrically connected in parallel by the electrode connection tabs. The lead connection tabs are connected to the electrode lead 300, and may protrude from the electrodes of the positive electrode and the negative electrode so as to be coupled to the electrode lead 300.

Specifically, the exterior material 100 may include an accommodating part 110 and a sealing part 120. The accommodating part 110 may form a space for accommodating the electrode assembly 200, and the sealing part 120 may be bonded to seal the accommodated electrode assembly 200 from the outside. As shown in FIG. 4B, the accommodating part 110 may correspond to an area of the two exterior materials 100 that face each other while being spaced apart from each other. In order to form the accommodating part 110, the exterior material 100 may be processed to be pressed and protruded in the thickness direction so that a predetermined area of the exterior material 100 has a substantially rectangular bowl (or cup) shape.

More specifically, the at least one pattern part 111*md* extending in the MD of the exterior material 100 may be formed on the surface of the accommodating part 110 of the present embodiment. The pattern part 111*md* extends in one direction and is repeatedly disposed in a direction intersecting with the one direction. Specifically, the pattern part 111*md* is protruded and recessed alternately in the thickness direction (i.e., protruded alternately in opposite directions) so as to have a concavo-convex shape along the one direction. Herein, the one direction may be the width direction 10A of the battery, which is the MD of the exterior material 100, and the direction in which the pattern part 111*md* is repeated may be the longitudinal direction 10B of the battery, which is the TD of the exterior material 100. Due to the protruded and recessed pattern part 111*md*, the exterior material 100 forming the accommodating part 110 may have a wavy or pleated pattern in the longitudinal direction as shown in FIG. 4B.

The sealing part 120 is formed by bonding two sealing surfaces. The sealing surfaces refer to bonding surfaces of the exterior material 100, and the two sealing surfaces overlapping along the edges of the accommodating part 110 are bonded to each other so that an inner space (the accommodating part 110) can be isolated from the outside. The electrode assembly 200 and the electrolyte described above may be accommodated in the inner space, and the electrode assembly 200 and the electrolyte may be kept in a sealed state.

That is, the sealing part 120 may enclose the pattern part 111*md* and form a sealed space between the two surfaces of the exterior material 100.

Further, the sealing part 120 may have a flat plate shape extending in the width direction 10A of the battery or the longitudinal direction 10B of the battery. For example, the flat plate shape of the sealing part 120 may be unbent so that its surfaces do not face each other. Alternatively, the sealing part 120 may have a different pattern from the pattern part 111*md*. For example, the sealing part 120 may have a pattern having a lower height in the thickness direction than the pattern part 111*md*.

An edge portion 110*e* of the pattern part may be adjacent to the sealing part 120. For example, the edge portion 110*e* of the pattern part may be adjacent to a portion of the sealing part 120 extending in the longitudinal direction 10B of the battery.

Meanwhile, the electrode lead 300 is connected to the electrode assembly 200 inside the exterior material 100 and extended to be exposed to the outside of the exterior material 100. The electrode lead 300 functions as a terminal for electrical connection with the electrode assembly 200 accommodated within the exterior material 100, and when the sealing part 120 is formed, the electrode lead 300 may be bonded as being interposed between the sealing surfaces so as to penetrate the sealing part 120. A pair of electrode leads 300 of the positive electrode and the negative electrode may be coupled to the respective lead connection tabs having the same polarity and provided in the electrode assembly 200.

The exterior material 100 of the present disclosure may be folded in the TD or MD of the exterior material 100 and used in manufacturing the battery 10. In this case, the exterior material 100 used in manufacturing the battery 10 is bent in the TD of the exterior material 100, and, thus, the battery can be bent in the TD of the exterior material 100. That is, the exterior material 100 may have mobility in the TD of the exterior material 100 due to the pattern part having a wavy or pleated pattern in the MD of the exterior material 100, and, thus, the battery using the exterior material 100 may also have mobility in the TD of the exterior material 100.

Figure 5A:
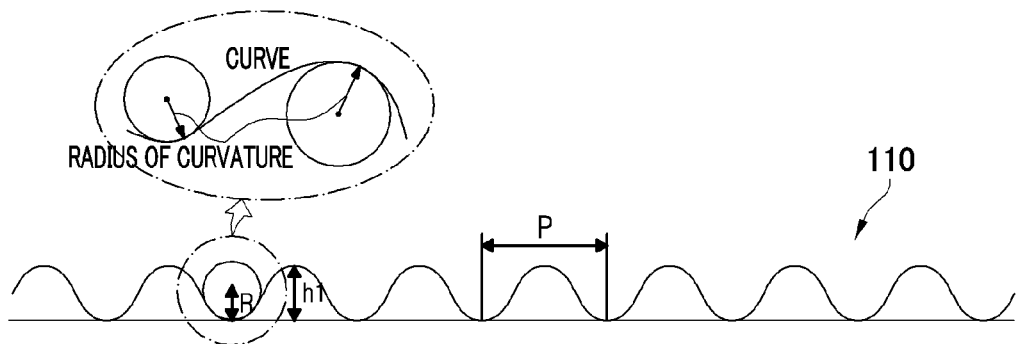
FIG. 5A is a diagram for explaining a cross-sectional shape of the pattern part and the radius of curvature of the pattern part according to an embodiment of the present disclosure.

Hereinafter, the exterior material 100 and the pattern part 111*md* according to an embodiment of the present disclosure will be described. FIG. 5A is a diagram for explaining a cross-sectional shape and the radius of curvature of the pattern part 111*md* according to an embodiment of the present disclosure. Referring to FIG. 5A, the pattern part 111*md* may be formed such that a concavo-convex shape having a constant pattern height h1 and a constant pattern pitch P is repeated. As shown in FIG. 5A, when the pattern part has a wavy pattern, the curvature indicates the degree of bending of a curve or curved surface and a radius of curvature R refers to the radius of a circular arc.

Figure 5B:
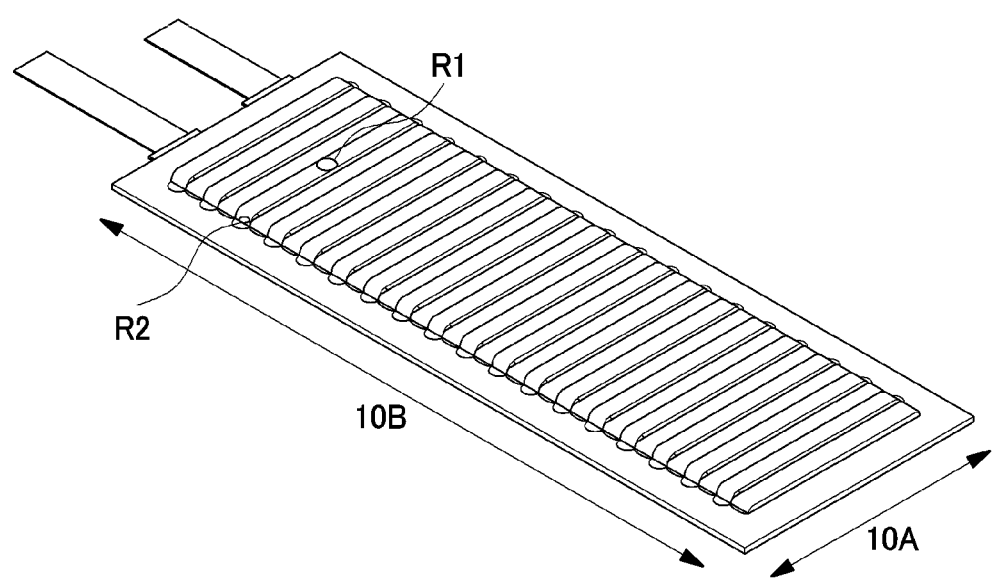
FIG. 5B is a diagram for explaining the radius of curvature of the pattern part according to an embodiment of the present disclosure.

FIG. 5B is a diagram for explaining the radius of curvature of the pattern part 111*md* according to an embodiment of the present disclosure. The radius of curvature of the pattern part 111*md* may decrease from a central portion toward an edge portion of the pattern part.

Figure 5C:
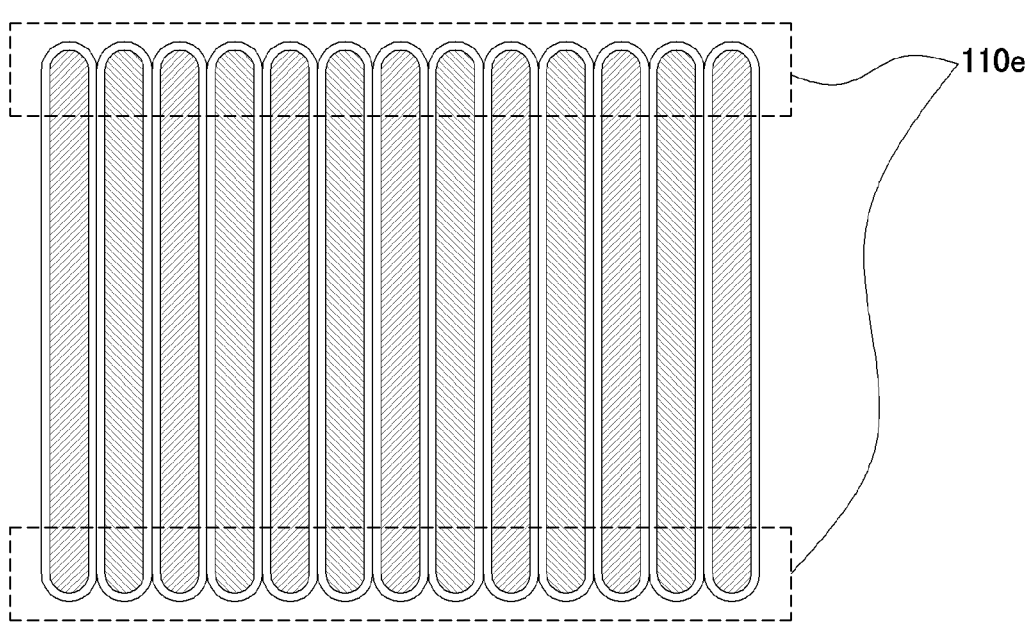
FIG. 5C is a diagram for explaining the shape of the pattern part when viewed from above according to an embodiment of the present disclosure.

FIG. 5C is a diagram for explaining the shape of the pattern part when viewed from above according to an embodiment of the present disclosure. When the pattern part 111*md* is viewed from above, a pattern width in the TD may decrease from the central portion toward the edge portion 110*e* of the pattern part. Referring to FIG. 5B and FIG. 5C, a radius of curvature R2 of the edge portion 110*e* of the pattern part may be smaller than the radius of curvature R1 of the central portion of the pattern part.

When a flexible battery is repeatedly deformed, the edge portion of the pattern part having a relatively small radius of curvature is more likely to be subjected to damage such as pinholes and cracks than the central portion of the pattern part having a large radius of curvature.

Table 1 shows the thickness of each component of an exterior material A, an exterior material B, an exterior material C and an exterior material D, and the total thickness of each of the exterior materials A to D. For example, the exterior material A, the exterior material B and the exterior material C may be roll-to-roll manufactured by lamination A, and the exterior material D may be roll-to-roll manufactured by lamination B.

TABLE 1

| Composition | A Lamination | | | B Lamination |
|---|---|---|---|---|
| | Exterior Material A | Exterior Material B | Exterior Material C | Exterior Material D |
| Total Thickness | 113 μm | 153 μm | 153 μm | 155 μm |
| Protection Layer 1 | — | 12 μm | 12 μm | 12 μm |
| Protection Layer 2 | 25 μm | 15 μm | 15 μm | 15 μm |
| Barrier Layer | 40 μm | 40 μm | 40 μm | 40 μm |
| Sealing Layer (Polymer 1/ Polymer 2) | 15 μm/30 μm | 40 μm/40 μm | 30 μm/50 μm | 80 μm |

Conventional batteries do not need to be bent or deformed. Thus, mechanical properties of an exterior material that appear when the exterior material is repeatedly folded have not been considered important.

However, as for an exterior material used for a flexible battery, the difference in mechanical properties of the exterior material between when the exterior material is never once folded and when the exterior material is repeatedly folded is significant. The direction of the pattern part, i.e., the direction of forming the pattern part may be determined based on the mechanical properties of the exterior material when each of the exterior material including the pattern part formed in the MD of the exterior material and the exterior material including the pattern part formed in the TD of the exterior material is repeatedly folded.

A flexible battery may be frequently damaged at a pattern edge of the exterior material having the smallest radius of curvature. In the folded (folding) state, the radius of curvature is the smallest, and the bending durability of the flexible battery can be easily known through a repeated folding evaluation of the exterior material (acceleration test).

Hereinafter, a tensile test after repeated folding will be described as a method of evaluating the durability of the exterior material included in the battery.

Samples of each exterior material having different orientations (MD, TD) in which the components of the exterior material and the pattern part are formed is punched out with a predetermined width and a predetermined length. For example, the exterior material may be punched out in a dumbbell shape having a width of 10 mm and a length of 100 mm.

Then, a central portion of each exterior material in the longitudinal direction is folded by pressing it at the same pressure for the same time. For example, an exterior material may be folded by pressing it at a pressure of 0.2 Mpa for 2 seconds. Each exterior material can be repeatedly folded and unfolded a plurality of times in the same manner.

A tensile tester can be used to fix a limiting displacement in the longitudinal direction of the sample and pull it at a predetermined strain. For example, an exterior material sample before stretching may have a length of 100 mm and the exterior material sample after stretching may have a length of 105 mm. The limiting displacement may be 5 mm, and the strain may be 5%.

For example, an exterior material on which a pattern part is formed in the MD of the exterior material (MD pattern) may be folded in the MD and stretched in the TD. An exterior material on which a pattern part is formed in the TD of the exterior material (TD pattern) may be folded in the TD and stretched in the MD.

After each exterior material is repeatedly folded the same number of times, whether the exterior material is damaged is checked with an electron microscope. Table 2 shows the results of the tensile test after repeated folding for the exterior materials A to D shown in Table 1.

As shown in Table 2, no damage was found in all of the exterior materials A, B, C and D in the case of stretching after folding five times.

In the case of stretching after folding ten times, as for the exterior materials A, B and C, no damage occurred in the exterior material samples with the pattern part formed in the MD of the exterior material, but damage occurred in the exterior material sample with the pattern part formed in the TD of the exterior material. As for the exterior material D, the degree of damage is greater in the exterior material sample with the pattern part formed in the TD of the exterior material than in the exterior material sample with the pattern part formed in the MD of the exterior material.

In the case of stretching after repeated folding fifteen times, as for the exterior materials A, B and C, the degree of damage is greater in the exterior material sample with the pattern part formed in the TD of the exterior material than in the exterior material sample with the pattern part formed in the MD of the exterior material.

As described above, the results of the tensile test after repeated folding for the exterior materials A, B, C and D show that as for the exterior materials A, B, C and D, the durability of the exterior material, i.e., the bending and folding durability of the exterior material, is higher in the exterior material folded in the MD and stretched in the TD than in the exterior material folded in the TD and stretched in the MD.

Since the pattern part is formed in the MD of the exterior material, damage to the edge portion of the pattern part having a small radius of curvature can be minimized and the bending durability of the battery can be improved.

Figure 6:
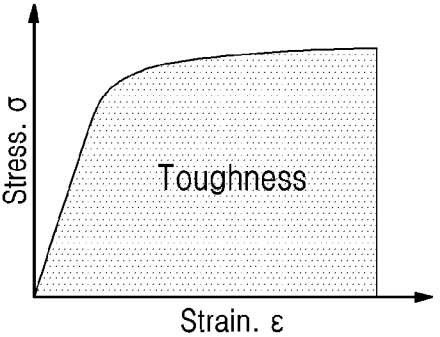
FIG. 6 is a stress-strain graph.

FIG. 6 is a stress-strain graph. In the graph shown in FIG. 6, toughness represents the area of the stress-strain curve.

Table 3 shows the results of evaluation of mechanical properties of the exterior material B after the above-described tensile test after repeated folding was performed.

TABLE 2

| | Stretching after folding five times | | Stretching after folding ten times | | Stretching after folding fifteen times | |
|---|---|---|---|---|---|---|
| | MD pattern (MD folding TD stretching) | TD pattern (TD folding MD stretching) | MD pattern (MD folding TD stretching) | TD pattern (TD folding MD stretching) | MD pattern (MD folding TD stretching) | TD pattern (TD folding MD stretching) |
| Exterior material A | No damage | No damage | No damage | Barrier layer damaged in part | Barrier layer damaged in part | Barrier layer and protection layer damaged in part |
| Exterior material B | No damage | No damage | No damage | Barrier layer and protection layer damaged | Barrier layer damaged in part | Cut (Barrier layer, protection layer and sealing layer damaged in whole) |
| Exterior material C | No damage | No damage | No damage | Barrier layer damaged in part | Barrier layer damaged in part | Barrier layer and protection layer damaged in whole |
| Exterior material D | No damage | No damage | Barrier layer damaged in part | Barrier layer and protection layer damaged | Cut (Barrier layer, protection layer and sealing layer damaged in whole) | Cut (Barrier layer, protection layer and sealing layer damaged in whole) |

TABLE 3

| Exterior Material B | MD pattern (MD folding TD stretching) | | TD pattern (TD folding MD stretching) | |
|---|---|---|---|---|
| | Maximum value of stress (Mpa) | Toughness(J cm$^{-3}$) | Maximum value of stress (Mpa) | Toughness(J cm$^{-3}$) |
| Stretching without folding | 74.59 | 15.24 | 64.51 | 16.00 |
| Stretching after folding five times | 74.59 | 15.24 | 58.76 | 9.11 |
| Stretching after folding ten times | 62.57 | 7.49 | 51.66 | 2.40 |
| Stretching after folding fifteen times | 56.72 | 4.62 | 47.07 | 1.08 |

Table 4 shows the results of evaluation of mechanical properties of the exterior material C after the above-described tensile test after repeated folding was performed.

TABLE 4

| Exterior Material C | MD pattern (MD folding TD stretching) | | TD pattern (TD folding MD stretching) | |
|---|---|---|---|---|
| | Maximum value of stress (Mpa) | Toughness(J cm$^{-3}$) | Maximum value of stress (Mpa) | Toughness(J cm$^{-3}$) |
| Stretching without folding | 70.44 | 16.01 | 68.85 | 16.48 |
| Stretching after folding five times | 68.82 | 14.62 | 66.82 | 14.97 |
| Stretching after folding ten times | 66.01 | 11.78 | 57.28 | 5.69 |
| Stretching after folding fifteen times | 54.94 | 2.80 | 49.79 | 2.54 |

Table 5 shows the results of evaluation of mechanical properties of the exterior material D after the above-described tensile test after repeated folding was performed.

TABLE 5

| Exterior Material D | MD pattern (MD folding TD stretching) | | TD pattern (TD folding MD stretching) | |
|---|---|---|---|---|
| | Maximum value of stress (Mpa) | Toughness(J cm$^{-3}$) | Maximum value of stress (Mpa) | Toughness(J cm$^{-3}$) |
| Stretching without folding | 64.56 | 12.58 | 64.93 | 10.65 |
| Stretching after folding five times | 60.41 | 7.85 | 59.96 | 5.62 |
| Stretching after folding ten times | 51.83 | 2.74 | 51.33 | 1.80 |
| Stretching after folding fifteen times | 45.92 | 1.66 | 50.85 | 1.61 |

In general, an exterior material roll-to-roll manufactured by lamination A or lamination B has excellent ductility in the MD of the exterior material and excellent rigidity in the TD of the exterior material.

Referring to FIG. 6 and Tables 3 to 5, as the number of times of repeated folding increases, the toughness is higher when the pattern part is formed in the MD of the exterior material than when the pattern part is formed in the TD. Therefore, it can be seen that as for all of the exterior materials B, C and D, the fatigue life of the exterior material is longer when the pattern part is formed in the MD of the exterior material.

The toughness of the exterior material D at the time of no folding, i.e., without repeated folding, tends to be opposite to the toughness of the exterior materials B and C without repeated folding due to the difference in lamination method and internal material. In a battery that is repeatedly bent or deformed, mechanical properties to be changed by repeated deformation are more significant than mechanical properties obtained when repeated folding is not performed.

Figure 7A:
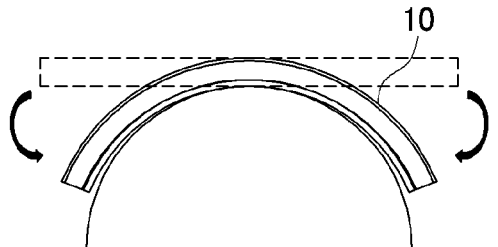
FIG. 7A is a diagram for explaining a method of evaluating the bending durability of a battery including an exterior material.

FIG. 7A is a diagram for explaining another method of evaluating the bending durability of a battery including an exterior material. Referring to FIG. 7A, a bending test may be performed by bending the battery 10 including the exterior material 100 a plurality of times in one direction.

Figure 7B:
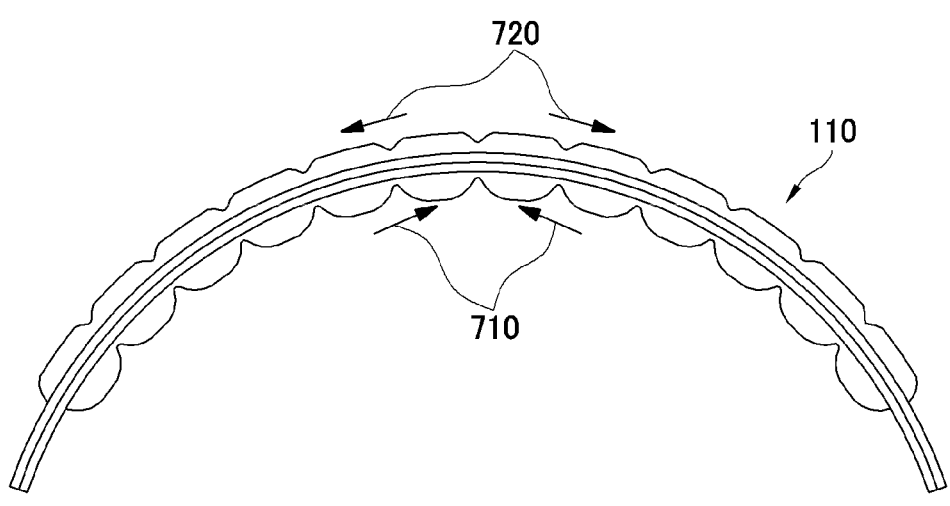
FIG. 7B is a diagram for explaining a force acting on the exterior material when evaluating the bending durability of the battery including the exterior material.

Referring to FIG. 7B, when the battery 10 including the exterior material 100 is bent, a force 710 is applied to the bending inner diameter in a direction of contracting the exterior material 100 and a force 720 is applied to the bending outer diameter in a direction of relaxing the exterior material 100. As for the battery 10 including the exterior material 100 with the pattern part 111*md*, a bending test may be performed in the TD of the exterior material. In other words, the bending test may be performed by bending the battery including the exterior material 100 in the longitudinal direction 10B of the battery.

As for the battery including the exterior material with the pattern part 111*td*, a bending test may be performed by bending the battery including the exterior material in the MD of the exterior material, i.e., in the longitudinal direction 10B of the battery.

In an embodiment, a bending test may be performed by bending the battery under conditions of R15 and 25 rpm.

Table 6 shows the results of the bending test performed on any one of the exterior materials A, B, C and D shown in Table 1 in a case where the pattern part is formed in the MD of the exterior material (MD pattern) or the pattern part is formed in the TD of the exterior material (TD pattern). For example, Battery 1 in Table 6 refers to a battery including the exterior material A on which a pattern part is formed in the MD of the exterior material.

TABLE 6

| Pattern Direction | | Battery 1 | Battery 2 | Battery 3 | Battery 4 | Battery 5 | Battery 6 | Battery 7 | Battery 8 |
|---|---|---|---|---|---|---|---|---|---|
| | | Classification | | | | | | | |
| | | Exterior Material A 113 μm | | Exterior Material B 153 μm | | Exterior Material C 153 μm | | Exterior Material D 155 μm | |
| | | MD pattern | TD pattern | MD pattern | TD pattern | MD pattern | TD pattern | MD pattern | TD pattern |
| Type of battery fault | Swelling | X | ○ | X | ○ | X | ○ | X | ○ |
| | Leakage of electrolyte | X | ○ | X | ○ | X | ○ | X | ○ |
| | Damage of exterior material | X | Concave pattern edge damage pinholes, cracks | X | Concave pattern edge damage pinholes, cracks | X | Pattern edge damage pinholes, cracks | Pattern edge severely scratched | Pattern edge damage pinholes, cracks |

According to the results of the bending test on Batteries 1 to 8 shown in Table 6, it was confirmed that as for all of the exterior materials A, B, C and D, the degree of damage of the edge portion of the pattern part when the pattern part is formed in the MD of the exterior material is remarkably reduced compared to that when the pattern part is formed in the TD of the exterior material.

Accordingly, by forming the pattern part in the MD on the exterior material, damage to the edge portion of the pattern part on the exterior material can be minimized. Thus, it is possible to suppress leakage of an electrolyte and swelling and also possible to improve the bending durability and safety of the battery.

FIG. 8 is a flowchart showing a method of forming a pattern on an exterior material according to an embodiment of the present disclosure.

In a process S810, the exterior material 100 may be located between an upper mold and a lower mold.

In a process S820, at least one pattern part 111md may be formed in the MD of the exterior material 100 by stamping the exterior material 100 using the upper mold and the lower mold.

Herein, the MD of the exterior material may refer to a width direction of a battery including the exterior material, and the TD of the exterior material may refer to a longitudinal direction of the battery including the exterior material.

In the descriptions above, the processes S810 to S820 may be divided into additional processes or combined into fewer processes depending on an embodiment. In addition, some of the processes may be omitted and the sequence of the processes may be changed if necessary.

FIG. 9 is a flowchart showing a method of manufacturing a battery including an exterior material according to an embodiment of the present disclosure.

In a process S910, at least one pattern part 111md may be formed on the exterior material 100 in the MD of the exterior material 100.

In a process S920, the exterior material 100 on which the pattern part 111md is formed may be folded.

In a process S930, the electrode assembly 200 may be inserted into the folded exterior material 100.

For example, an exterior material may include a pattern part corresponding to an upper surface of a battery and a pattern part corresponding to a lower surface of the battery in the MD of the exterior material, and the exterior material may be folded along the central axis between the two pattern parts in the TD of the exterior material (folding operation).

The exterior material folded along the central axis between the two pattern parts is located such that the pattern part corresponding to the upper surface of the battery overlaps the pattern part corresponding to the lower surface of the battery, and an electrode assembly may be inserted to overlap the pattern parts.

For another example, an exterior material on which a pattern part is formed in the MD of the exterior material may be folded in the MD of the exterior material. An electrode assembly may be inserted into the folded exterior material.

In a process S940, the exterior material 100 into which the electrode assembly 200 is inserted may be sealed. For example, the exterior material 100 may include four sealing areas formed by sealing four surfaces enclosing the exterior material, and two of them may be formed in the MD of the exterior material 100 and the other two may be formed in the TD of the exterior material 100.

Herein, the MD of the exterior material may refer to a width direction of a battery including the exterior material, and the TD of the exterior material may refer to a longitudinal direction of the battery including the exterior material.

In the descriptions above, the processes S910 to S940 may be divided into additional processes or combined into fewer processes depending on an embodiment. In addition, some of the processes may be omitted and the sequence of the processes may be changed if necessary. In particular, the process of forming the pattern part on the exterior material may be performed before sealing the exterior material or after sealing the exterior material in the present disclosure.

In an exterior material according to the present disclosure, the fatigue life against deformation of an edge portion of a pattern part may be set based on a pattern part formed in the MD of the exterior material. For example, the fatigue life against deformation of an edge portion of at least one pattern part formed in the MD of the exterior material may be longer than the fatigue life against deformation of an edge portion of a pattern part of another exterior material including at least one pattern part formed in the TD of the exterior material.

Accordingly, the exterior material according to the present disclosure includes an exterior material on which a pattern part is formed in the MD of the exterior material, and, thus, the fatigue life of the edge portion of the pattern part of the exterior material can be improved. Herein, the fatigue life may refer to the fatigue life against deformation caused by a force applied to the edge portion of the exterior material such as folding (e.g., folding of the exterior material to manufacture a battery), bending (e.g., bending of the battery or exterior material), and repeated folding (e.g., repeated folding of the exterior material to test battery durability).

That is, the pattern part may be formed in the MD of the exterior material in consideration of probability of damage to the edge portion of the pattern part of the exterior material. By forming the pattern part in the MD of the exterior material, it is possible to reduce the probability of damage to the pattern edge portion having a relatively small radius of curvature in the pattern part of the exterior material.

As described above, the battery including the exterior material on which the pattern part is formed in the MD of the exterior material has a small bending radius and thus can be applied to a device that has a relatively high fatigue strength.

For example, the battery in the device may have a bending radius in the range of 5R (finger circumference) to 35R (ankle circumference) and can be applied to devices such as a wrist band, a wristwatch, a smart ring device and the like.

The above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

We claim:

1. A battery including an exterior material, the exterior material comprising:

at least one pattern part formed in a machine direction (MD) of the exterior material; and a sealing part enclosing the pattern part and formed by bonding parts of two surfaces of the exterior material to form a sealed space between the two surfaces, wherein the MD of the exterior material is a width direction of a battery including the exterior material, a transverse direction (TD) of the exterior material is a longitudinal direction of the battery including the exterior material, an edge portion of the pattern part is adjacent to the sealing part, a radius of curvature of the edge portion of the pattern part is smaller than a radius of curvature of a central portion of the pattern part, and the central portion of the pattern part is located in the width direction of the battery from the edge portion of the pattern part.

2. The battery of claim 1, wherein the exterior material is folded in the TD of the exterior material during manufacturing of the battery, and the battery is configured to be bent in the TD of the exterior material.

3. The battery of claim 1, wherein the exterior material is folded in the MD of the exterior material during manufacturing of the battery, and the battery is configured to be bent in the TD of the exterior material.

4. The battery of claim 1, wherein a radius of curvature of the pattern part decreases from a central portion toward the edge portion of the pattern part.

5. The battery of claim 1, wherein the pattern part is formed in the MD of the exterior material in consideration of probability of damage to the edge portion of the pattern part.

6. The battery of claim 1, wherein a fatigue life against deformation of the edge portion of the pattern part is set based on the pattern part formed in the MD of the exterior material.

7. The battery of claim 6, wherein the fatigue life against deformation of the edge portion of the pattern part is longer than a fatigue life against deformation of an edge portion of a pattern part of another exterior material including at least one pattern part formed in the TD of the exterior material.

8. The battery of claim 1, wherein the exterior material is formed into a multilayer structure in which at least one material is laminated.

9. A method of manufacturing a battery including an exterior material, comprising:

forming at least one pattern part on an exterior material in a machine direction (MD) of the exterior material;

folding the exterior material;

inserting an electrode assembly into the folded exterior material;

sealing the exterior material into which the electrode assembly is inserted;

forming a sealing part enclosing the pattern part by bonding parts of two surfaces of the exterior material to form a sealed space between the two surfaces, wherein the MD of the exterior material is a width direction of the battery including the exterior material, a transverse direction (TD) of the exterior material is a longitudinal direction of the battery including the exterior material, an edge portion of the pattern part is adjacent to the sealing part, a radius of curvature of the edge portion of the pattern part is smaller than a radius of curvature of a central portion of the pattern part, and the central portion of the pattern part is located in the width direction of the battery from the edge portion of the pattern part.

* * * * *